No. 822,637. PATENTED JUNE 5, 1906.
E. L. TUCKER.
METERING DEVICE FOR ENGINES.
APPLICATION FILED JULY 31, 1903.
3 SHEETS—SHEET 2.
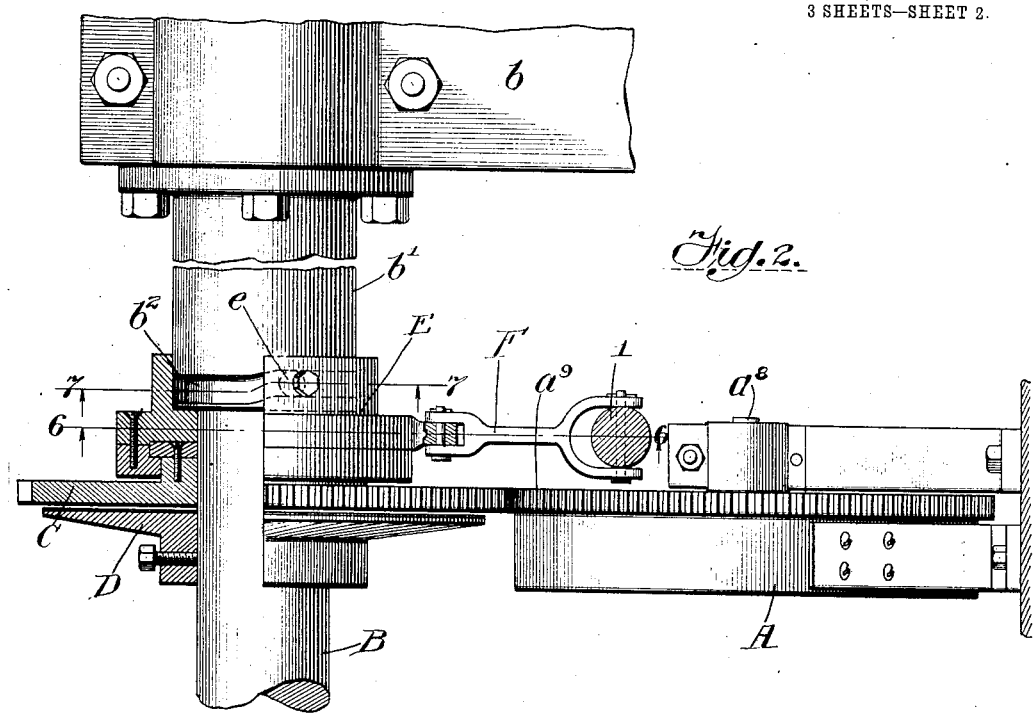
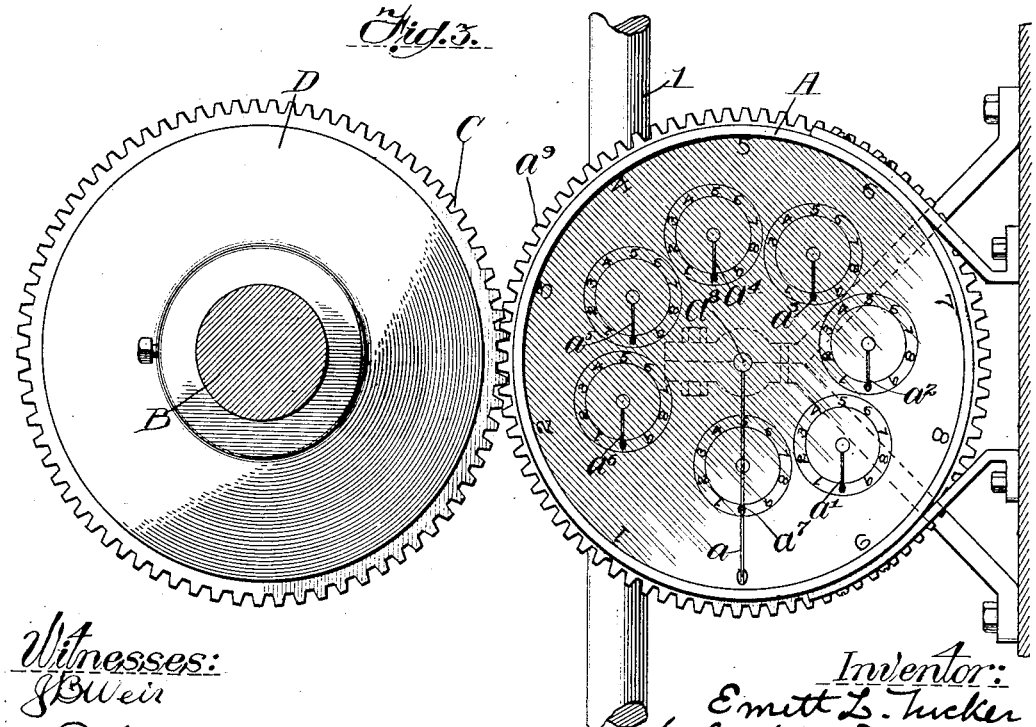
Witnesses:
J. B. Weir
Robert H. Weir
Inventor:
Emitt L. Tucker
by Bulkley & Durand
Attys No. 822,637. PATENTED JUNE 5, 1906.
E. L. TUCKER.
METERING DEVICE FOR ENGINES.
APPLICATION FILED JULY 31, 1903.
3 SHEETS—SHEET 3.
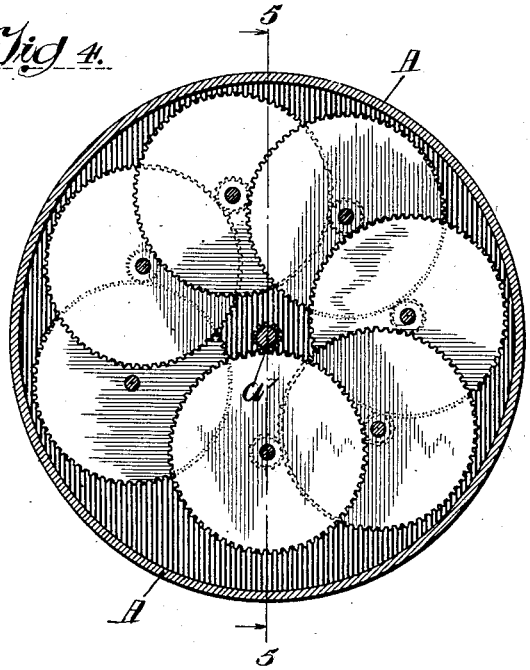
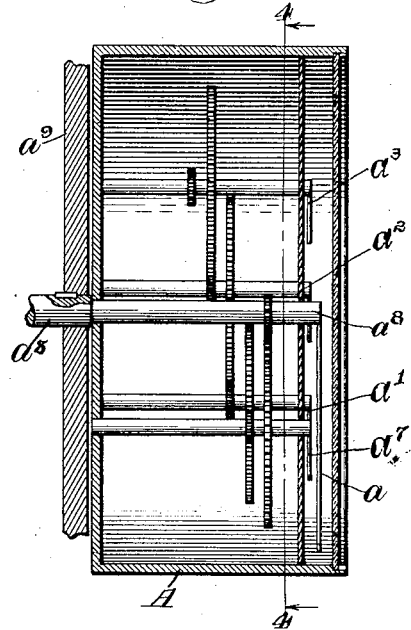
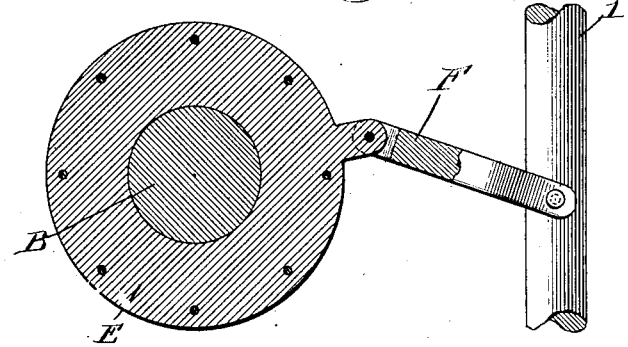
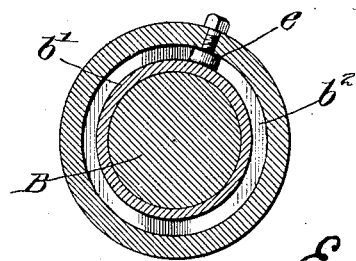
Witnesses:
J. B. Weir
T. Hobert
Inventor:
Emitt L. Tucker
by Bulkley & Durand
Attys.

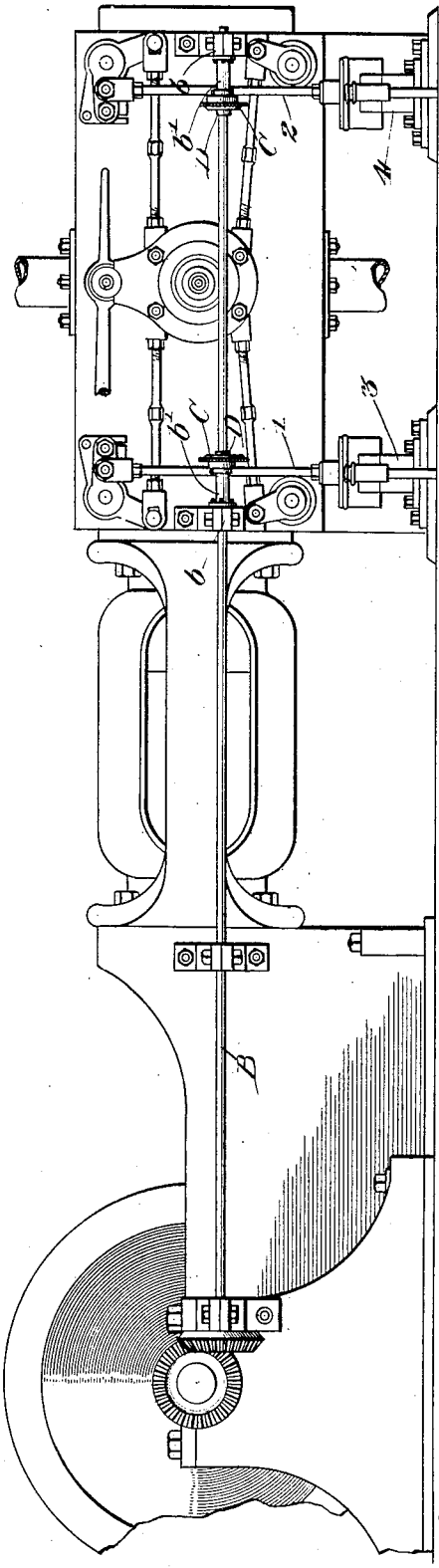

UNITED STATES PATENT OFFICE.

EMETT L. TUCKER, OF CHICAGO, ILLINOIS.

METERING DEVICE FOR ENGINES.

No. 822,637.

Specification of Letters Patent.

Patented June 5, 1906.

Application filed July 31, 1903. Serial No. 167,692.

*To all whom it may concern:*

Be it known that I, EMETT L. TUCKER, a citizen of the United States of America, and a resident of Chicago, Cook county, Illinois, have invented a certain new and useful Improvement in Metering Devices for Engines, of which the following is a specification.

My invention contemplates a registering device for metering the distance or number of feet traveled by an engine-piston under direct or boiler pressure.

As is well known, considerable difficulty is often experienced in regulating steam and other like engines and in obtaining from these engines the highest degree of efficiency of which they are capable. Very often the true difficulty consists in an inability to determine the exact manner in which the engine is operating—that is to say, with respect to the proportion of work done by direct or boiler pressure relative to the proportion done by expansion. With my improved metering device, however, it is possible to keep an exact record of the number of feet traveled by the piston under direct or boiler pressure during a certain period of time. In this way an engineer can see at a glance just what his engine is doing, can readily determine whether the engine is operating as efficiently as is possible for it to do, and can at all times have an indicator at hand by which to accurately regulate his engine with a view to securing the highest possible efficiency.

To the foregoing and other useful ends my invention consists in matters hereinafter set forth and claimed.

In the accompanying drawings, Figure 1 is a side elevation of a steam-engine of the well-known Corliss type and equipped with my improved metering device. Fig. 2 is an enlarged plan of my improved metering device and the clutch mechanism for operating it. Fig. 3 is a front elevation or face view of the device shown in Fig. 2. Fig. 4 is a view of the meter with the dial or front plate removed. Fig. 5 is a section on line 5 5 in Fig. 4. Fig. 6 is a section on line 6 6 in Fig. 2. Fig. 7 is a section on line 7 7 in Fig. 2.

The engine shown in Fig. 1 is of the well-known Corliss type, and for this reason a detailed description of its construction is not necessary. It will be sufficient to say that the rods 1 and 2 are the plunger-rods of the dash-pots 3 and 4, which constitute a familiar and well-known feature of this type of engine.

Referring to Figs. 2 and 3, the meter or registering device A can be of any suitable known or approved construction. As illustrated, it is provided with pointers $a$, $a'$, $a^2$, $a^3$, $a^4$, $a^5$, $a^6$, and $a^7$, each having a dial and each adapted to indicate units, tens, hundreds, &c., as the case may be. In other words, these pointers and their dials constitute the means for registering the number of feet traveled by the engine-piston under direct or boiler pressure during a certain period or interval of time. As illustrated, this metering device is conveniently attached to the side of the cylinder. Preferably with the type of engine shown there are two of these metering devices, one associated with each of the rods 1 and 2. The internal construction of the meter, as shown, comprises a central shaft $a^8$, which carries said pointer $a$ and which, as will be observed, is gear-connected with the other and smaller pointers. A large gear-wheel $a^9$ is keyed to this shaft $a^8$. Any suitable means can be employed for actuating this metering device. For example, the shaft B, gear-connected at its forward end with the main crank-shaft of the engine and supported at its rear end in suitable bearings, can be employed as the medium of power-transmitting connection for actuating said metering devices. As illustrated, the said shaft is supported in bearings $b$, to which are attached sleeves $b'$, having cam-grooves $b^2$. A loose clutch member C is associated with each of said sleeves and mounted on said shaft. A fixed or constantly-rotating clutch member D is mounted on the shaft and associated with each loose clutch member. These, as will be seen, constitute friction-clutches. The members C have toothed peripheries, which mesh with and engage the gear-wheels $a^9$. The loose clutch members C are adapted to be reciprocated upon the shaft by the shifters E, which are each provided with a roll $e$, adapted to engage the cam-groove $b^2$ of the adjacent sleeve. As shown, these shifters E are connected with the rods 1 and 2 by links F.

As shown in Figs. 2, 3, 6, and 7, the rod 1 is at the limit of its downward stroke and the piston is traveling under expansion; but the minute the rod 1 rises the consequent partial rotation of the shifters E will enable the cam-groove $b^2$ of the roll $e$ to force the member C into engagement with the flat rubber or other surface of the constantly-rotating clutch member D. This, it will be seen, results in a rotary movement of the member C and a consequent actuation of the metering device. The rotation of the meter-pointers continues as long as the piston travels under direct or boiler pressure and as long as the rod remains in its elevated position; but the minute the cut-off occurs and as soon as the piston starts to travel under expansion then the rod falls, and in so doing opens or disconnects the power-transmitting connection between the engine and the metering device. In this way an accurate record will be kept of the number of feet which the piston travels under direct or boiler pressure. Knowing the total number of feet traveled by the piston in a given time, the engineer then of course can readily determine whether the engine is working properly and can make whatever adjustments of the valves, &c., as are necessary. In order to determine the total number of feet traveled by the piston in a given time, it will probably be desirable to employ a speed-indicator. A speed-indicator of any suitable known or approved construction can be employed. It is quite likely, however, that with many engineers the provision of a speed-indicator will not be necessary. It will be understood that the reciprocation of the rods 1 and 2 and the consequent movement of the links F is sufficient to produce the desired oscillation or partial rotation of the members E. It is obvious, however, that any other suitable power-transmitting connection can be employed for operating the clutches.

What I claim as my invention is—

1. The combination of an engine, a metering device, a power-transmitting connection between the engine and the metering device, said power-transmitting connection including a clutch adapted to be closed by the engine as soon as the piston starts to travel under direct or boiler pressure, and adapted to be opened by the engine as soon as the said direct or boiler pressure is cut off.

2. The combination of a fluid-pressure engine having cut-off devices, whereby the engine may operate part of the time under direct or boiler pressure and the balance of the time under expansion, a metering device connected with and adapted to be operated by the engine, and means operated by the cut-off devices of the engine for controlling the operation of said metering device.

3. The combination of an engine having cut-off devices, whereby the engine may operate part of the time under direct or boiler pressure and the balance of the time under expansion, and a metering device adapted and connected for registering the number of feet traveled by the engine-piston under direct or boiler pressure.

4. The combination of an engine having cut-off devices, whereby the engine may operate part of the time under direct or boiler pressure and the balance of the time under expansion, and a metering device adapted and connected to register the number of feet traveled by the engine-piston under one of said conditions.

Signed by me at Chicago, Cook county, Illinois, this 23d day of July, 1903.

EMETT L. TUCKER.

Witnesses:
ALBERT ANDERSON,
WM. A. HARDENS.